United States Patent [19]

Goldstein

[11] 4,389,570
[45] Jun. 21, 1983

[54] WIDE RANGE RADIATION MONITORING APPARATUS

[75] Inventor: Norman P. Goldstein, Murrysville, Pa.

[73] Assignee: Westinghouse Electric Corp., Pittsburgh, Pa.

[21] Appl. No.: 189,490

[22] Filed: Sep. 22, 1980

Related U.S. Application Data

[63] Continuation of Ser. No. 20,598, Mar. 14, 1979, abandoned.

[51] Int. Cl.³ .............................................. G01T 1/24
[52] U.S. Cl. .................................... 250/370; 250/374
[58] Field of Search ............... 250/370, 371, 390, 392, 250/374

[56] References Cited

U.S. PATENT DOCUMENTS 4,118,626 10/1978 Goldstein et al. ................. 250/370

Primary Examiner—Eugene La Roche
Assistant Examiner—Carolyn E. Fields
Attorney, Agent, or Firm—M. P. Lynch

[57] ABSTRACT

An emitter plate of a high atomic number material is positioned between collector plates of a low atomic number material and the ionization current developed in the gap regions therebetween in response to low radiation fields and the self-powered current developed in response to high radiation fields is measured by a current measuring circuit as an indication of impinging radiation.

3 Claims, 3 Drawing Figures

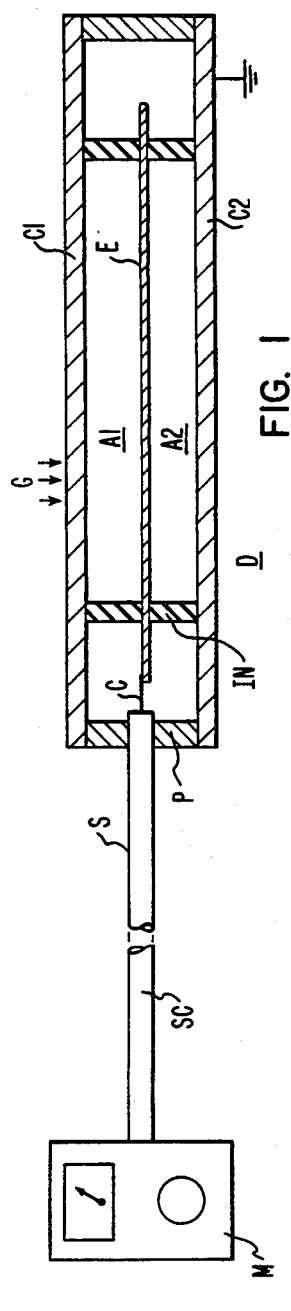
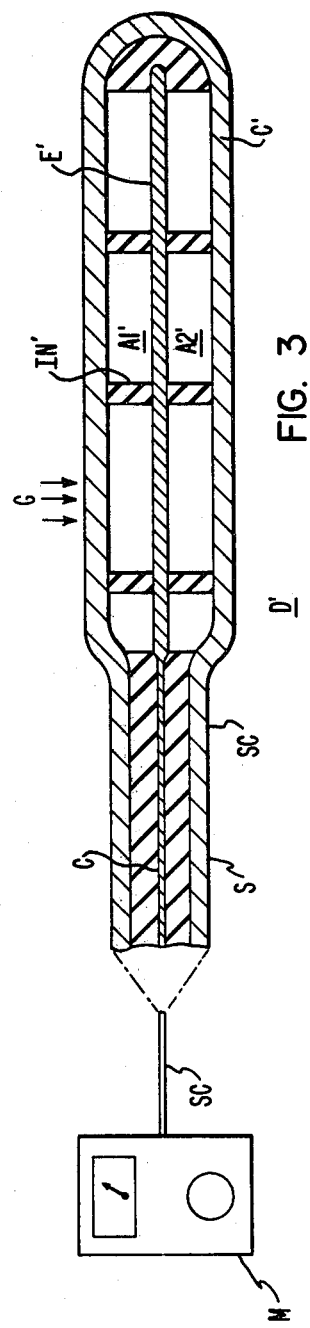
FIG. 1
FIG. 3

WIDE RANGE RADIATION MONITORING APPARATUS

This is a continuation of application Ser. No. 020,598, filed Mar. 14, 1979, now abandoned.

BACKGROUND OF THE INVENTION

In order to meet the safety regulations imposed on facilities associated with the storage, use or disposition of radioactive materials used in nuclear reactors, or the monitoring of an accident situation, there is a critical requirement for a radiation monitoring apparatus which is both rugged and reliable, and capable of indicating fields from 1 R/hr up to $10^8$ R/hr and continue to operate even if exposed to high radiation doses and/or temperatures of up to approximately 250° C.

Such an apparatus would find wide-spread use for monitoring radiation fields present at various locations around a nuclear power plant as well as monitoring radiation fields in stored fuel areas, high-level waste areas, as well as monitoring the activity in the primary coolant of a nuclear reactor.

SUMMARY OF THE INVENTION

There is described herein with reference to the accompanying drawing a simple and rugged detector capable of measuring radiation fields over the range of 0.02 R/hr up to $10^8$ R/hr or higher. It is basically a combination of an ionization device and self-powered device which does not require an external power supply. The detector consists of an emitter element of high atomic number material which is connected to the center conductor of a signal cable. This emitter element is positioned in a spaced apart relationship between collector elements of a low atomic number material with a gap region between the emitter element and the adjacent collector elements.

The presence of a radiation field of gamma rays ejects electrons from both the emitter and collector elements which produce ionization in the gap regions. In low radiation fields the device functions in an ionization mode and the ion pairs produced in the gap regions are collected by the contact potential between the different metals making up the emitter and collector elements. In high radiation fields the ion collection is much less efficient and the current produced directly by the electrons ejected from the elements dominates so the device functions as a self-powered current device. The disclosed apparatus is extremely simple in construction and is both rugged and reliable. The apparatus is capable of withstanding high radiation doses and operating temperatures up to 250° C. without a significant deterioration in performance.

The novel radiation monitoring apparatus disclosed herein is particularly suitable for use as an accident monitoring device for nuclear reactor facilities and also for use in monitoring high field locations such as fuel storage locations, high level waste storage areas, as well as other applications associated with breeder reactor facilities. The inventive concept can be employed as an in-core detector wherein the emitter element is a wire coaxially disposed within a tubular collector element.

The novel radiation monitoring detector operates as a self-powered device, i.e., without any external power supply, thus resulting in an extremely simple system consisting only of the detector itself, a signal cable and a current measuring device. In addition, the voltages involved are extremely shall with only about 0.5 V across the detector and no voltage at all across the signal cable. The simplicity of the system results in high reliability while the low voltages involved mean that the detector and/or signal cable can be subjected to substantial radiation damage and ambient temperatures up to 250° C. before a noticeable degradation in detector performance occurs.

A competing conventional system would require the use of a conventional ionization chamber system. Such a system would require a miniature ionization chamber, a cable for both the high voltage and signal, a high voltage power supply and a current measuring device. In order for the ionization chamber to function properly, it would require that a considerable fraction of the charge liberated by the radiation field be collected, even at the highest range. This requires that the chamber be small and that the applied voltage be relatively high, i.e. 200–300 V. The required small size means that at low fields the sensitivity will be considerably lower than that of the disclosed detector. The high applied voltage required for the ionization chamber in the conventional system means that triaxial signal cable and guard rings in the chamber itself are required, making the system considerably more expensive than the disclosed detector. Finally the additional requirement of the power supply and the applied high voltage makes the conventional ionization chamber considerably less reliable. The extra reliability possessed by the disclosed detector is important for these high radiation level applications since the high fields would make it extremely difficult to replace the detectors or signal cable once the system has been installed.

In summary, the novel detector described herein is superior to a conventional ionization chamber system because of its wider operating range, its higher sensitivity at low fields, its simplicity and superior reliability.

BRIEF DESCRIPTION OF THE DRAWING

The invention will become more readily apparent from the following exemplary description in connection with the accompanying drawings:

FIG. 1 is a sectioned schematic illustration of a wide range radiation monitoring device employing the inventive features;

FIG. 3 is a sectioned illustration of an alternate embodiment of the invention.

DESCRIPTION OF THE PREFERRED EMBODIMENT

Figure 2:
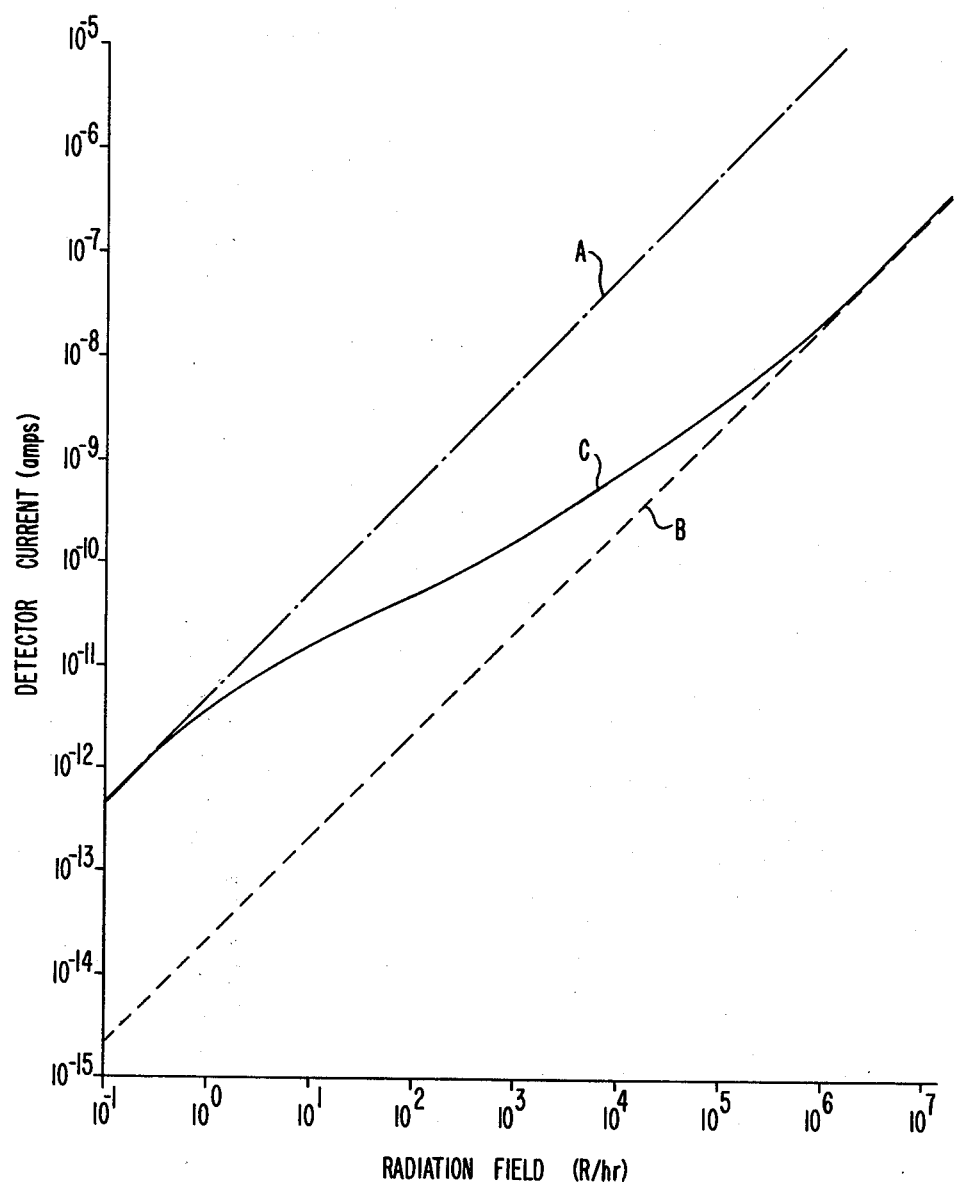
FIG. 2 is a graphical illustration of the operation of the apparatus of FIG. 1.

Referring to FIG. 1, there is schematically illustrated a radiation detector D which is connected to a current measuring circuit M via a signal cable SC.

In the simplified embodiment of FIG. 1 the detector D consists of a thin plate emitter element E positioned and supported between parallel collector plate elements C1 and C2 by electrical insulators IN. The emitter element E is a high Z material such as W, Ta, Pt, Au, Pb, etc., while the collector elements C1 and C2, which are thicker than the emitter E, consist of a low Z material such as Al, Ni, Fe, etc. End plates P, which extend between the collectors C1 and C2 and are typically made of the same material as collectors C1 and C2, form an enclosed volume V and provide electrostatic shielding and mechanical rigidity. The insulators IN which extend between the collectors C1 and C2 and support the emitter E in a spaced-apart relationship from the collectors C1 and C2, are typically constructed from $Al_2O_3$ or $MgO$. The signal cable SC consists of an inner electrical conductor C and an outer shield S. The inner conductor C is connected to the emitter plate E while the collectors C1 and C2, which are grounded, are connected to the shield S via the end plates P.

The thickness of the emitter E will depend on the density of the material used. If the thickness is measured in terms of $gm/cm^2$, a suitable thickness range is about 0.1 to 1.0 $gm/cm^2$. This corresponds to a thickness of between about 0.002 inch and 0.020 inch for platinum. If it is anticipated that predominantly high energy gamma rays are being detected, i.e., above 4 Mev, then the thickness of the emitter E could be between 2 and 3 $gm/cm^2$.

The thickness of the collectors C1 and C2 is typically about $\frac{1}{8}$ inch to $\frac{1}{4}$ inch to provide the necessary mechanical rigidity. The collectors C1 and C2 should be made of the same material in order to provide a symmetrical response. Furthermore, the emitter E should be positioned at an equal distance from the inside surface of collectors C1 and C2 to assure the desired operational symmetry. Thus, the gap regions A1 and A2 would be the same. While this is a preferred configuration, the detector D would work if the emitter E was not positioned equally distant from the collectors C1 and C2. The latter situation may be appropriate when a minimum thickness detector D is required.

The spacing between the emitter plate E and the collector plates C1 and C2, defined as gap regions A1 and A2, will vary depending on the detector application but would typically be between approximately 1/16 inch and $\frac{1}{2}$ inch.

The end plates P provide the desired electrostatic shielding for the detector D by completely enclosing the emitter E.

Gamma radiation G impinging on the outside surface of the collector C1 will cause electrons to be released by the collector C1 and transmitted to the adjacent surface of the emitter E.

At the same time most of the incident gamma rays pass through the collector C1 without interacting and reach the emitter E. This flux of gamma rays results in the ejection of electrons from the emitter E by means of photoelectric and compton interactions to the lower collector C2.

The electrons traveling between the plates of the detector D produce ion pairs within the gap regions A1 and A2. In a conventional ionization chamber, a voltage would be applied to collect this separated charge. In the disclosed embodiment however, use is made of the contact potential difference between the emitter E and the collectors C1 and C2 to provide this collecting voltage. This contact potential arises spontaneously due to the different work functions of the metals used for the emitter E and the collectors C1 and C2 and thus the detector D does not require any external power supply. Thus, one of the current producing mechanisms in the device D involves the collection of the ion pairs produced in the gap regions A1 and A2 by electrons emitted by the collectors and the emitter. The voltage required to collect the resulting charge arises from the contact potential difference between the elements of dissimilar materials.

The volume V and the gap regions A1 and A2 are filled with a gas, such as air, that has a relatively low recombination coefficient. The recombination coefficient is a measure of how easily electrons recombine with the positive ions created by their liberation.

If the inner conductor C and the shield S of the signal cable SC are made of the same material, then no voltage will result across the cable SC and thus it is possible to have a voltage across the elements of the detector D without having a voltage on the signal cable SC. The significance of this will become apparent from the following discussion.

The second current producing mechanism involves a true self-powered current. The number of electrons released from the emitter E in response to impinging gamma radiation G will be higher than the electrons released by the collectors C1 and C2 because the higher Z material of the emitter E will result in a higher number of interactions and produce higher energy electrons than that produced by the lower Z material of the collectors.

Thus the difference in work functions of the emitter and collector materials assures the necessary contact potential for producing the ionization current which dominates a low radiation levels, while the difference in the atomic number of the materials produces the self-powered current which dominates at high radiation levels.

The current measuring device M basically indicates the net flow of electrons into or out of the emitter E. For the self-powered current this consists of two components, electrons from the collector elements C1 and C2 flowing into the emitter element E and those ejected from the emitter plate. As stated, the material of the emitter plate E is selected so that the current of electrons ejected from the emitter plate E is larger than that from C1.

The existence of the above-described current producing mechanisms enable the device D to function effectively over a much wider useful range of radiation than is available from conventional devices. This increased range is due to the fact that at very low radiation fields, the contact potential, which is quite small, i.e. 0.5 V, is capable of collecting a large fraction of the ion pairs produced in the gap regions A1 and A2. This current can be as much as 250 times higher than the self-powered current and thus at low fields, detector D is 250 times more sensitive than a device using only the self-powered mechanism.

Extensive experimentation has been conducted using a tantalum plate of 0.010 inch thickness as the emitter element E and aluminum plates of 0.25 inch thickness for the collector elements C1 and C2. The tantalum emitter E was $4'' \times 4''$ in size and the measured contact potential was approximately 0.6 volts. Measurements performed in a 60 Co field showed that fields of less than 1 R/hr could easily be measured using a Kiethley 600A Electrometer as the current measuring circuit M. The background current was about $4 \times 10^{-14}$ Amps and a field of 0.1 R/hr produced a current of about $5 \times 10^{-13}$ A, while a 1 R/hr produced a current of approximately $4 \times 10^{-12}$ A, both of which were easily measurable. The corresponding self-powered currents were $2 \times 10^{-15}$ A and $2 \times 10^{-14}$ A, respectively. These results indicate that in actual practice, fields as low as approximately 0.1 R/hr could be measured with no difficulty using the radiation monitor configuration of the detector D of FIG. 1. It was further determined that higher currents could be realized by using larger collector and emitter plate elements since there are no practical restraints on the size of the detector D. For instance, a detector D utilizing 12"×12" collector and emitter plate elements would produce a current which is equal to 144/16, or 9, times higher than the 4"×4" detector utilized to produce the above measurements.

In higher fields, the small value of the contact potential results in a competition between the ion pair recombination process and the charge collection process and a smaller and smaller fraction of the liberated charge is actually collected. In this region of operation, experimental analysis indicates that the current continues to increase monotonically but approximately as the square root of the strength of the radiation field. (Reference "Direct Conversion of Nuclear Radiation Energy", by George H. Miley, American Nuclear Society publication 1970.) The direct self-powered current, however, is unaffected by these considerations and changes linearly with the radiation field. Thus, at high fields, i.e., $>10^4$ R/hr, the current from the two described mechanisms become comparable and at still higher fields the self-powered current dominates, thus resulting in a linear response. The much lower sensitivity associated with the self-powered mechanism is no longer important in a high radiation field condition.

For example, at $10^6$ R/hr, the self-powered current is approximately $2\times 10^{-8}$ amperes which represents no measurement problem. The overall response function over a radiation range from $10^{-1}$ to $10^7$ R/hr is graphically illustrated in FIG. 2. A plot of detector current versus radiation field for the detector D is plotted as curve C against an ionization chamber response curve A and a self-powered response curve B. It is seen from FIG. 2 that the response of the detector D moves from the high sensitivity ionization chamber response curve A to the lower sensitivity self-powered response curve B as the radiation field increases. At low radiation fields, the response of the detector D is entirely the result of ionization, while at high radiation fields, the response of the detector D is almost entirely from the self-powered current. Therefore, the detector configuration of FIG. 1 is capable of detecting radiation fields over a wide range because of its high sensitivity at low radiation fields and lower sensitivity at high radiation fields.

Thus, the radiation detector D operates without any external power supply thus making the detector D an extremely simple apparatus consisting only of the detector D, signal cable SC, and the current measuring circuit M. Furthermore, the voltages involved are extremely small with only about 0.5 volts across the detector elements and no voltage across the signal cable SC. The simplicity of the detector D results in high reliability and the low voltages involved means the detector D and/or signal cable SC can be subjected to significant radiation exposure as well as ambient temperatures of up to approximately 250° C. without a noticeable degradation in the performance of the detector D.

While the response of detector D is non-linear over the wide radiation range, the detector D does provide linear response at the low radiation fields and at the very high radiation fields. The linear response at the high radiation fields is most important in that it will be in this range that the most important radiation measurements will be made in practical applications. Compensation for the non-linear response in the middle radiation levels can be accommodated in the measuring circuit M.

While the above discussion has been directed to the parallel plate detector configuration of FIG. 1, the inventive concept can be embodied in a tubular configuration D' as illustrated in FIG. 3. The collector plates C1 and C2 of FIG. 1 are replaced with a single tubular collector element C' within which is positioned an emitter wire or rod element E' so as to define the gap regions A1' and A2'. The measuring circuit M is connected to the detector D' by the signal cable SC wherein the shield S is connected to the tubular collector element C' and the conductor C is connected to the emitter element E'.

The coaxial arrangement of emitter element E' within the tubular collector C' in combination with the signal cable SC constitutes an in core gamma sensitive self-powered detector which is far superior to conventional in core detectors.

A typical implementation of the detector D' of FIG. 3 consists of a platinum emitter element E', an Inconel collector element C' and ceramic insulators IN' comprised of $Al_2C_3$ or MgO supporting the emitter element E' within the collector element C'. As described above, impinging gamma radiation results in electrons being ejected from the emitter E' and the collector C' by means of photoelectron and compton interactions. The ion pairs produced in the gap regions A1' and A2' by the electrons crossing the gap regions A1' and A2' are collected without requiring an external power supply by making use of the contact potential difference between the emitter E' and collector C' as discussed above.

The advantage of the in core detector design of FIG. 3 is that it provides a device D' which operates as a standard self-powered detector in the reactor power range while also providing measurement capabilities during start-up.

Further implementations of the above described inventive concepts include the construction of a low radiation detector and a separate high radiation detector.

A low radiation detector would include collector and emitter elements of different work functions to establish the contact potential required for generating the ionization current which is dominant at low radiation levels.

A high radiation detector would include collector and emitter elements wherein the atomic number of the emitter element is higher than the collector element to support a self-powered current at high radiation fields.

What is claimed is:

1. A wide range radiation detector apparatus for generating a current signal measurement of impinging radiation in a range from about $10^{-1}$ to about $10^8$ R/hr, said current signal including an ionization current component and self-powered current component, comprising:

a self-contained single detector means consisting of spaced apart collector means and an emitter element disposed therebetween, said collector means being constructed of a material having a different work function and different atomic number from the material of said emitter element, a gas filling the volume defined by said spaced apart collector means, said volume of gas being such that the ionization current component of said current signal exceeds the self-powered current component at low radiation levels, the self-powered current component of said current signal exceeding said ionization current component at high radiation levels; and current measuring means connected to said detector to manifest said current signal as an indication of impinging radiation.

2. A wide range detector apparatus, comprising:

an enclosure means including spaced apart collector means defining an enclosure volume therewithin;

an emitter element positioned within said enclosure volume and spaced apart from said collector means by at least 1/16 inch, the combination of said spaced apart collector means and said emitter element forming a radiation detector;

said collector means being constructed of a material which is different than the material of said emitter element, said materials being of different work functions and different atomic numbers, the work functions of said materials comprising said collector means and said emitter element producing a contact potential between said collector means and said emitter element such that a charge generated within said volume due to incident radiation is collected and a corresponding ionization current is developed, the difference in atomic numbers of the collector means and said emitter element resulting in a greater number of electrons being released from said emitter element than from said collector means in response to incident radiation and resulting in a self-powered current;

a gas filling said volume, said volume of gas being such that the ionization current dominates the self-powered current at low levels of incident radiation; and current measuring means operatively connected to said collector means and said emitter element to measure said ionization current as a measurement of low levels of incident radiation, and to measure the self-powered current as a measurement of high levels of incident radiation.

3. A low range radiation detector apparatus, comprising:

a gas enclosure means including spaced apart collector means defining a volume therebetween;

an emitter element positioned within said gas enclosure means and positioned between said collector means at a spacing of at least 1/16 inch, said combination of said collector means and said emitter element forming a low level radiation detector means;

said collector means and said emitter element being constructed of materials of different work functions, the different work functions producing a contact potential between said collector means and said emitter element;

a gas filling said volume, the spacing of said collector means being such as to assure a gas volume within which the ion pairs generated in response to electrons ejected from said emitter element in response to impinging radiation will result in a charge collected in response to said contact potential which is sufficient to produce an ionization current indicative of the low level impinging radiation; and means for measuring said ionization current.

* * * * *